3,618,490
AMMETER POINTER ARRESTER FOR SINGLE
REFLEX CAMERA EXPOSURE METERS
Akio Okamoto, Osaka-shi, and Syotaro Inagaki, Okazaki-shi, Japan, assignors to Minolta Camera Kabushiki Kaisha
Filed Oct. 13, 1969, Ser. No. 865,896
Claims priority, application Japan, Oct. 19, 1968, 43/91,390
Int. Cl. G03b 7/12
U.S. Cl. 95—10 C           3 Claims

ABSTRACT OF THE DISCLOSURE

A device for arresting a pointer of an ammeter for an exposure meter, which is interlocked, by actuation of an automatic diaphragm controlling mechanism, to the preset diaphragm aperture so that the pointer is arrested and released by means of the pointer arresting device in accordance with the shutter release in a single reflex camera.

BACKGROUND OF THE INVENTION

In a single reflex camera, in general in order to facilitate the focusing and the image adjusting prior to exposure the diaphragm is fully opened, and when exposed the diaphragm is reduced from full opening to the preset diaphragm value setup beforehand by means of the automatic diaphragm controlling mechanism. The reflector is moved and the shutter is released, and soon after exposure the reflector is moved again to its original position to fully open the diaphragm.

Automatic exposure controlling, especially T.T.L. (through the lens). Systems, for a single reflex camera, is achieved by observing the brightness of an object at the time when the diaphragm is opened fully and in accordance with an observation value controlling the exposure. Either the shutter speed and the diaphragm aperture are fixed, or when the diaphragm is adjustable the shutter speed should be fixed in accordance with the observation value of the brightness of the object and the diaphragm aperture setup.

SUMMARY OF THE INVENTION

The primary object of the present invention is to provide a device for arresting a pointer of ammeter for an exposure meter which operates the automatic exposure controlling mechanism in a single reflex camera. For this purpose the ammeter pointer is interlocked with the operation of the automatic diaphragm controlling mechanism which is released in conjunction with the shutter release operation. The ammeter pointer is released from its interlocked by a member to which the returning operation of the automatic diaphragm controlling mechanism is effected simultaneously with the termination of the exposure.

The second object of the present invention is to ensure operation of the pointer arresting device and quickly effect the pointer release soon after the exposure is finished.

The third object of the present invention is to interlock the pointer arresting release with the return operation of the automatic diaphragm controlling mechanism, and interlock the pointer arresting and its release with the automatic diaphragm controlling mechanism.

The fourth object of the present invention is to control the exposure value accurately and reliably in a T.T.L. type system automatic exposure controlling mechanism for a single reflex camera.

The fifth object of the present invention is to reduce the preliminary stroke taken until the shutter is released by the release operation member and reduce the reaction given thereto to facilitate the operation thereof.

BRIEF DESCRIPTION OF THE DRAWINGS

FIGS. 1 through 3 are perspective views of an embodiment in accordance with the present invention, wherein FIG. 1 shows the shutter in a cocked position, FIG. 2 illustrates the pointer checked by the pointer arresting member upon release of the shutter, and FIG. 3 shows the pointer released from the pointer arresting member after the exposure is finished.

DESCRIPTION OF THE PREFERRED EMBODIMENT

Figure 1:
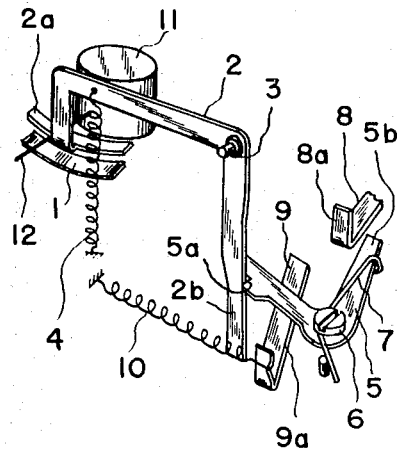
Figure 3:
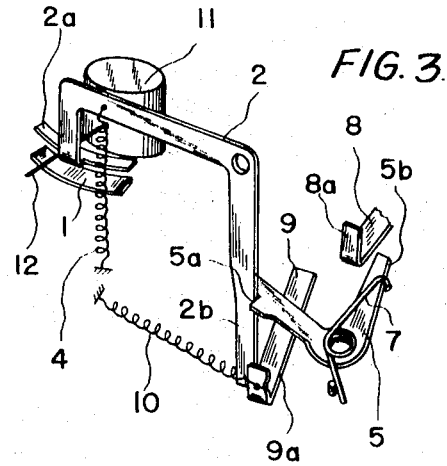
Figure 2:
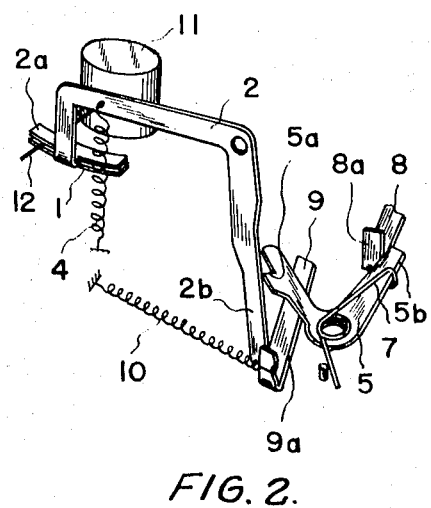

In the embodiment shown in FIGS. 1 through 3, pointer receiver 1 is fixed to the camera body, and pointer 12 of ammeter 11 of the exposure meter is mounted to the camera body in parallel with pointer receiver 1.

Pointer arresting member 2, having on its one arm pointer arresting plate 2a facing pointer receiver 1 with pointer 12 interposed therebetween is pivoted on the camera body by pin 3, and biased to rotate counter-clockwise by means of spring 4 to allow pointer arresting plate 2a to press pointer 12 into contact with pointer receiver 1. The other arm of pointer arresting member 2 extends downwardly and is bent substantially at right angles to constitute engaging arm 2b.

V-shaped check lever 5 is pivoted on the camera body by pin 6 at right angles to engaging arm 2b and is formed with check step portion 5a on one arm thereof and is rotatably biased to allow said arm to come into contact with engaging arm 2b of pointer arresting member 2 by means of spring 7. The other arm of V-shaped check lever 5, namely, driven arm 5b, is positioned in the turning track of projection 8a of operation lever 8 for stopping the lens in an automatic diaphragm controlling mechanism (not shown in the drawings) disposed to engage therewith. The automatic diaphragm controlling mechanism is well known to the art and does not, itself, form part of the invention.

The turning stroke of engaging arm 2b of pointer arresting member 2 is intersected by diaphragm full opening operation lever 9, and is biased with spring 4 which provides a stronger bias than spring 10.

In the situation where the shutter is cocked as shown in FIG. 1, engaging arm 2b of pointer arresting member 2 is turned clockwise against spring 4 to engage with check step portion 5a of check lever 5 and is locked in that position so that pointer arresting plate 2a retracts from pointer 12 and pointer receiver 1 and pointer 12 can turn freely.

When the automatic diaphragm controlling mechanism is released by well known mechanism in connection with the shutter release operation, operation lever 8 is turned counter-clockwise in FIG. 1, and protrusion 8a engages with check lever 5 to turn it clockwise against spring 7 and break the engagement of check step portion 5a and engaging arm 2b, so that pointer arresting member 2 is turned counter-clockwise by spring 4. Accordingly, pointer arresting plate 2a moves to fix pointer 12 onto pointer receiver 1 as shown in FIG. 2.

When the shutter release operation is continued, the reflector is turned and in succession the exposure is effected. After the exposure, by means of a well known mechanism, the shutter releases the checking of the diaphragm full opening operation lever 9 in the automatic diaphragm controlling mechaism, so that lever 9 is turned clockwise in FIG. 2 by means of spring 10 to engage with arm 2b of pointer arresting member 2 and turn it clockwise against spring 4, therefore, the checking of the pointer by pointer arresting plate 2a is released and arm 2b of pointer arresting member 2 engages with check step portion 5a of check lever 5 and is stopped in the position as it is as shown FIG. 3. Next, when the shutter is cocked diaphragm full opening operation lever 9 is turned counter-clockwise to be returned to the position shown in FIG. 1.

Figure 4:
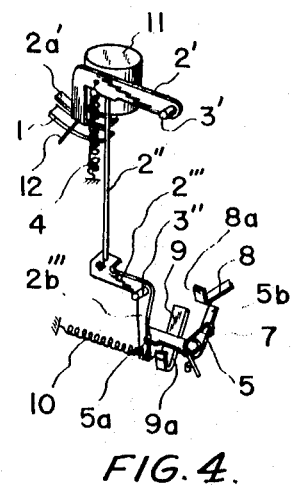
FIG. 4 is a perspective view showing the shutter in a cocked condition, in another embodiment in accordance with the present invention.

In another embodiment shown in FIG. 4, the exposure meter is provided on the upper side of the camera body and the automatic diaphragm controlling mechanism is provided on the lower side of the camera body. In this case, pointer arresting members 2' and 2''' are separated by rod 2'', and on the end portion of upper member 2', pivoted on the camera body by pin 3', are provided pointer arresting plate 2a' and spring 4. On lower member 2''', pivoted on the camera body by pin 3'', there is provided engaging arm 2'''b, and both members 2' and 2''' are rotated as one body by means of connecting rod 2''. In its operation, this embodiment is quite the same as the first embodiment described above.

That is, in the first stage stroke of the release operation, when the automatic diaphragm controlling mechanism operates and the stop down operation lever 8 is turned to release arm 2'''b of lower member 2''' by check step portion 5a of check lever 5, so that upper member 2' and lower member 2''' are pulled by connecting rod 2'' to turn counter-clockwise. Accordingly, pointer 12 is locked between arresting plate 2'a and pointer receiver 1. Soon after exposure diaphragm full opening operation lever 9 is released and is turned clockwise and thereby arm 2'''b of lower member 2''' is pushed to move clockwise so as to engage with check step portion 5a of check lever 5. Simultaneously therewith, upper member 2' is turned clockwise by connecting rod 2'' and pointer 12 is released.

In the embodiment described above, in order to facilitate the understanding of the invention the description is given with the stop down operation lever (of the automatic diaphragm controlling mechanism) is actuated and stimultaneously the diaphragm blades actuate the stop down operation. As a rule, automatic shutter exopsure adjusting is the only operation effected. However, in the embodiment described above, by providing a time delay between the actuation of the stop down operation lever and the actuation of the stop down operation of the diaphragm blades, and during the time delay by allowing the stop down operation lever to operate the check lever so as to finish the checking operation, whereby the pointer is checked, it is possible to effect the stop down operation of the diaphragm blades corresponding to the position for checking the pointer and also effect what is called program system automatic exposure adjustment. In the latter adjustment, the diaphragm aperture and the shutter speed corresponding to the position of the ammeter pointer are established preferentially the shutter speed.

We claim:

1. In a single lens reflex camera having an automatic diaphragm pre-setting mechanism and a means for resetting the diaphragm automatically to its full open condition after exposure operation of the camera, the combination comprising; an exposure meter having a pointer; a receiver member for supporting said pointer; an arresting member rotatably mounted to the camera body and biased to move from a rest position at which said pointer is movable to an operative psition for contacting said pointer with said receiver member; a locking member for holding said arresting member in said rest position, and a means for disengaging said locking member from said arresting member in response to the operation of said automatic diaphragm pre-setting mechanism.

2. The combination as set forth in claim 1 further comprising; a resetting member operated by said means for resetting the diaphragm automatically and moving said arresting member from said operating position to said rest position.

3. The combination as set forth in claim 1 wherein said arresting member includes two operating members spaced from one another by a connecting rod, one of said operating members having a plate engaging said pointer with said receiver member in said operative position and the other of said operating members engaging said locking member to hold said arresting member in said rest position.

References Cited

UNITED STATES PATENTS

| | | | |
|---|---|---|---|
| 3,078,772 | 2/1963 | Goshima | 95—10 C |
| 3,108,522 | 10/1963 | Maitani | 95—10 C |
| 3,301,153 | 1/1967 | Ataka | 95—10 C |
| 3,446,130 | 5/1969 | Engelsmann et al. | 95—10 C |

JOSEPH F. PETERS, JR., Primary Examiner

U.S. Cl. X.R.

95—42, 64 B